United States Patent [19]

Tauster et al.

[11] 4,149,998

[45] Apr. 17, 1979

[54] SUPPORTED METAL INTERACTION CATALYSTS

[75] Inventors: Samuel J. Tauster, Englishtown; Lawrence L. Murrell, Elizabeth; Shun C. Fung, Edison, all of N.J.

[73] Assignee: Exxon Research & Engineering Co., Florham Park, N.J.

[21] Appl. No.: 771,396

[22] Filed: Feb. 23, 1977

Related U.S. Application Data

[63] Continuation-in-part of Ser. No. 673,378, Apr. 5, 1976, abandoned.

[51] Int. Cl.$^2$ .................. B01J 23/58; B01J 23/64; B01J 23/78; B01J 23/84
[52] U.S. Cl. .................................. 252/473; 252/461; 252/472
[58] Field of Search ..................... 252/472, 473, 461

[56] References Cited

U.S. PATENT DOCUMENTS

| | | | |
|---|---|---|---|
| 3,180,820 | 4/1965 | Gleim et al. | 208/254 H |
| 3,262,874 | 7/1966 | Gatsis | 208/254 H |
| 3,278,421 | 10/1966 | Gatsis | 208/216 X |
| 3,385,670 | 5/1968 | Van Hook et al. | 252/472 X |
| 3,579,569 | 5/1971 | Montgomery et al. | 252/472 X |
| 3,784,675 | 1/1974 | Kobylinski et al. | 423/213.5 |
| 3,922,235 | 11/1975 | DeLuca et al. | 252/472 |

FOREIGN PATENT DOCUMENTS

1327495 8/1973 United Kingdom.

OTHER PUBLICATIONS

Dollimore et al., "Energetic Nature of Catalyst Surface," J. of Catalysis 28, 275-281 (1973).

*Primary Examiner*—W. J. Shine
*Attorney, Agent, or Firm*—Joseph J. Allocca

[57] ABSTRACT

This invention relates to a class of heterogeneous catalysts. More particularly, it pertains to catalysts consisting of group VIII metals dispersed on oxide carriers selected from the group consisting of Ti, V, Nb and Ta and mixtures thereof, and zirconium titanate and $BaTiO_3$, it having been discovered that these oxide carriers are capable of exerting remarkable effects on the properties of the Group VIII metals so dispersed. Among the strong effects on the properties of supported Group VIII metals which these carriers have been observed to bring about are the suppression of the capacity of the Group VIII metals to chemisorb hydrogen at room temperature, the suppression of the capacity of the Group VIII metals to chemisorb carbon monoxide at room temperature and profound alterations in the activity and/or selectivity of various Group VIII metals in reactions such as the dehydrocyclization of n-heptane and the hydrogenolysis of ethane.

These catalyst compositions which exhibit suppression of $H_2$ and CO chemisorption are prepared by methods known in the art, but differ from the prior art methods in that reduction in a hydrogen or other reducing gas atmosphere at a temperature sufficient to result in a catalyst possessing the desired characteristics is a necessary step.

32 Claims, No Drawings

SUPPORTED METAL INTERACTION CATALYSTS

CROSS REFERENCE TO RELATED APPLICATIONS

This application is a continuation-in-part of Ser. No. 673,378 filed Apr. 5, 1976, now abandoned.

BRIEF DESCRIPTION OF THE INVENTION

This invention relates to a class of heterogeneous catalysts. More particularly, it pertains to catalysts consisting of Group VIII metals dispersed on oxide carriers selected from the group consisting of Ti, V, Nb and Ta and mixtures thereof, and zirconium titanate and $BaTiO_3$, it having been discovered that these oxide carriers are capable of exerting remarkable effects on the properties of the Group VIII metals so dispersed. Among the strong effects on the properties of supported Group VIII metals which these carriers have been observed to bring about are the suppression of the capacity of the Group VIII metals to chemisorb hydrogen at room temperature, the suppression of the capacity of the Group VIII metals to chemisorb carbon monoxide at room temperature and profound alterations in the activity and/or selectivity of various Group VIII metals in reactions such as the dehydrocyclization of n-heptane and the hydrogenolysis of ethane.

These catalyst compositions which exhibit suppression of $H_2$ and CO chemisorption are prepared by methods known in the art, but differ from the prior art methods in that reduction in a hydrogen or other reducing gas atmosphere at a temperature sufficient to result in a catalyst possessing the desired characteristics is a necessary step.

PRIOR ART

U.S. Pat. No. 3,317,439 to A. B. Stiles teaches a catalyst wherein the aggregates of catalyst crystallites are kept separated by means of a refractory oxide which catalyst-refractory oxide aggregates are then themselves kept separated by means of a third component. The refractory oxides used are described as those having a melting point above 1000° C.

A long list of useful catalytic materials is given including metallic platinum, nickel, copper, palladium, ruthenium. The interspersant refractory oxides are also represented by a long list which teaches the equivalence of the many listed oxides. Calcination temperatures of 200°-500° C. are listed as useful.

This patent, by broadly teaching equivalence teaches away from the instant invention which teaches the superiority of specific supports and combinations of support materials and the necessity of there being a pretreatment step in which the catalytic system is exposed in a reducing atmosphere to temperatures above specific minimum levels if catalysts possessing the desired properties are to be generated. U.S. Pat. No. 3,784,675 to Kobylinski et al teaches a $NO_x$ reduction process which utilizes a catalyst consisting of Ru on a carrier which may be selected from the group consisting of alumina, silica, magnesia, thoria, titania, zirconia and combinations thereof. These catalysts may be prepared by techniques standard in the art, i.e. aqueous impregnation of the carrier with a salt of the metal followed by drying for a time at 200° F., and then calcining for a time at from about 700° F. to about 1000° F. This patent teaches the equivalence of a broad spectrum of carrier materials and does not recognize the criticality of the proper choice of support materials nor does it recognize that certain critical minimum reduction temperatures must be utilized in the preparation of the catalyst (once the correct support is chosen) in order to generate a catalyst which exhibits resistance to $H_2$ and CO chemisorption. Furthermore, this patent makes no mention of hydrogen reduction at the critical temperature and this step is necessary for the production of a catalyst which possesses and exhibits the desired properties.

U.S. Pat. No. 3,278,421 to Gatsis teaches the hydrofining of Petroleum Crude Oil and a catalyst therefor. The catalyst involved comprises a refractory inorganic oxide, an absorbed hydrocarbon and a heteropoly acid. The catalyst is further described as being comprised of a Group VB, VIB and VIII metal or combination thereof on a support from the group alumina, silica, zirconia, magnesia, titania, boria, strontia, hafnia and mixtures thereof. Preferably the carrier has at least a portion of alumina present; most preferably, the carrier is a composite of alumina and silica. All of the examples and discussions of the patent deal with alumina containing supports. Clearly, this patent teaches the equivalence of a vast number of unrelated supports and does not recognize the superiority of the supports enumerated in the instant invention when such supports, in conjunction with Group VIII metals are treated in a reducing atmosphere at temperatures above some certain minimum.

The paper, *Journal of Catalysis* 28, 275–281 (1973) "Energetic Nature of Catalyst Surfaces" by Dollimore and Harrison, teaches a method for investigating the energetic nature of catalyst surfaces by thermal desorption experiments. This method has been used to study supported cobalt catalysts. The catalyst investigated was cobalt on rutile prepared by impregnating a nonporous rutile with cobalt nitrate. The catalyst was dried at 120° C. The catalyst, containing 4 wt. % cobalt, was reduced in situ at 330° C. with a flow of 50 ml/min. of purified hydrogen. After reduction, the sample was evacuated and then subjected to desorption at elevated temperature of up to 550° C. This catalyst system of Co on rutile does not possess the strong bonding interactions which characterize catalysts of the instant invention since the temperature of reduction (330° C.) is too low. Desorption at 550° C. does not lead to an SMSI type catalyst (defined in detail below) either since high temperature treatment in the absence of hydrogen (i.e. nonreductive high temperature treatment) is ineffective to yield an SMSI system.

*Journal of Electron Spectroscopy and Related Phenomena* 6 (1975) 17–26, Escard and Pontvianne—several iridium supported catalysts were studied by means of X-ray photoelectron spectroscopy. The catalysts contained 5 wt. % iridium impregnated from aqueous solution of hexachloroiridic acid on δ-alumina, silica, zinc oxide, titanium oxide and Ketgen silica alumina and were used to catalytically oxidize olefins. Upon reduction, the iridium 4f doublet is shifted to higher binding energies with respect to that of unsupported iridium and the iridium lines have an anomalous breadth. It is postulated that an electron interaction occurs between the support acting as an electron acceptor and the metal acting as an electron donor. The chemical shifts depend on the nature of the support, increasing $ZnO < SiO_2 < TiO_2 < Al_2O_3$.

The iridium catalysts are pretreated by a reduction in $H_2$ at a temperature of 400° C. resulting in 5 wt. % Ir on $TiO_2$ with a particle size of 150 Å. Particles of this size are not characterized as SMSI type since the degree of bonding, if any, is miniscule with very low dispersion.

It is well known that the metals of Group VIII play an important role in heterogeneous catalysis. In many processes of technological interest, the required properties of catalytic activity and selectivity necessitate the presence of one or more metals of this group. Familiar examples are the hydrogenation of unsaturated aliphatic hydrocarbons or aromatics and the reforming of petroleum naphthas.

In the majority of instances, however, Group VIII metals are not employed by themselves, i.e., as metal films, wires, or powders, but as a supported phase on a carrier of sufficient surface area to effect a high degree of utilization of the metal. As only the surface of a metal particle can participate in a catalytic process, it is a matter of economic importance to maximize the surface area of a given amount of metal, that is, to 'disperse' it efficiently. This is particularly true when dealing with costly metals, such as the noble metals of Group VIII.

The problem of efficiently dispersing a metal on a support may be analyzed in terms of the typical means of preparation. As ordinarily practiced, this involves contacting the support with a solution containing a salt of the metal, drying and treating the catalyst in a stream of hydrogen so as to reduce the impregnated salt to the metallic state while removing other ions in the form of volatile species, such as HCl. If, for example, a catalyst comprising platinum on alumina is prepared in accordance with this general method, a degree of dispersion of platinum approaching 100% can be obtained, as determined by standard methods of gas adsorption. This means that virtually every platinum atom present in the catalyst is a surface atom, which is obviously a desirable situation from the point of view of catalytic application.

It is highly desirable to disperse the metal crystallites in a supported metal catalyst as extremely small metal particles in order to maximize the utilization of the supported metal. Thus, a catalyst containing 1000 Å crystallites of platinum will have a degree of metal dispersion equal to 1%; if these are replaced by 100 Å crystallites, the degree of dispersion increases to 10%; if the crystallite size attains a value of 10 Å or lower, the dispersion can be considered to be complete.

The metal crystallites, in the finished catalyst, arise via the reduction of crystallites of the precursor salt. It is obvious that there will be a general correspondence between small salt crystallites, in the catalyst precursor before reduction, and small metal crystallites in the finished catalyst. In turn, the formation of small salt crystallites in the dried, unreduced catalyst precursor will be enhanced by distributing the salt solution over a large area of support surface, so that as water is removed during the drying process, the quantity of salt precipitating onto each unit area of the support will be relatively small. This will obviously be conducive to the formation of small salt crystallites, and therefore to the formation of small metal crystallites.

In this account of the typical preparation of a supported-metal catalyst, and the factors leading to good metal dispersion in such a catalyst, it is to be noted that the role of the support is simply a geometrical one. Thus, by virtue of its high surface area, the support enables only a minute amount of impregnated salt solution to be associated with unit area of the support. This leads to small salt crystallites after drying, which in turn leads to small metal crystallites after reduction. Although specific chemical affinities may influence the resultant metal dispersion in a secondary way, the geometrical effect exerts the major influence in the preparation of a well dispersed supported-metal catalyst. Thus, it is no surprise that materials that are widely dissimilar from a chemical viewpoint, such as alumina and carbon, are both able to efficiently disperse supported metals, provided that they are employed in their customary high surface area form, e.g. $>100$ m$^2$/g. On the other hand, if their surface areas are severely reduced, they become ineffective for metal dispersion.

The intent of the preceding paragraphs has been to point out that the action of the support in bringing about an efficient dispersion of the metallic phase is primarily a geometrical, non-chemical one. In particular, no strong chemical interaction between the support and the metallic phase is required to bring about good dispersion of the latter and, indeed, in conventional supported-metal catalysts evidence is available to indicate that such interaction does not take place. To illustrate this last point, one may cite the fact that unsupported Group VIII metals, and particularly the noble metals, have the capacity to chemisorb hydrogen at room temperature. When supported on common carriers, such as alumina, silica, or carbon, this capacity is retained and, in fact, is frequently exploited to determine their degree of dispersion. Degrees of dispersion which are determined in this way are found to be in good agreement with those obtained by means of electron microscopy and X-ray diffraction line broadening (see J. H. Sinfelt, "Catalysis Over Supported Metals," Chemical Engineering Progress Symposium Series, 63 (73), 16–21 (1967)). The X-ray line broadening technique is particularly applicable for crystallites above 50 Å. For crystallites smaller than 40 Å the diffraction lines are too diffuse to apply this method and in particular when the metal concentration is low and the support has strong scattering power. In general when no metal X-ray line can be observed in the diffraction spectrum the metal crystallites are much smaller than 50 Å.

Experiments have been performed which indicate that even the details of the platinum-hydrogen interaction are modified little, if at all, by the presence of the support. Thus, the results of a temperature-programmed-desorption of hydrogen from a platinum/alumina and platinum/silica catalyst have been found to be closely similar. This would not be expected if either alumina or silica interacted significantly with platinum dispersed upon it.

The catalysts of the present invention include Group VIII metals supported on the oxides of titanium, vanadium, niobium, tantalum and mixtures thereof, and zirconium titanate and barium titanate. Whereas these metals, when supported on the most common carriers, i.e., alumina, silica or carbon, as well as on other frequently encountered carriers, such as magnesium oxide, silica-alumina, etc. are found to retain their capacity for hydrogen chemisorption, these same metals when supported on the oxides of titanium, vanadium, niobium, tantalum and mixtures thereof and zirconium titanate and alkaline earth titanates, are found, surprisingly, to exhibit a marked suppression of this capacity, in several instances amounting to virtually total elimination of this property. In addition, other adsorptive and catalytic properties of the Group VIII metals have been found to be profoundly altered when they are dispersed on these same oxides.

To date, it has not proven possible to unambiguously establish the nature of the metal-support interaction responsible for the various effects on the properties of the metal that have been observed. As is well known, there are fundamental difficulties inherent in any attempt to characterize a well-dispersed supported phase. In view of this, any model proposed for the catalyst systems described in this application must be considered to be speculative. With this borne in mind, the applicants advance the hypothesis that the chemical nature of the strong metal-support interactions (hereinafter abbreviated as SMSI, as in SMSI effects, SMSI catalysts, etc.), described in this application, consists essentially of covalent bond formation between the metal atoms of the supported phase, and Group IVB or Group VB metal cations at the surface of the support.

It is to be noted that the postulation of such an interaction is quite unprecedented in the chemical literature. Nevertheless, reference can be made to two classes of compounds which incorporate types of bonding interactions that bear a certain, although limited, resemblance to that proposed here in relation to SMSI catalyst systems. These are the hexagonal barium titanates and the Lewis-acid-base intermetallic compounds which will be briefly discussed in turn.

The hexagonal barium titanates (described by Dickson et al, J. Am. Chem. Soc. 83, 3026 (1961)) comprise a group of complex oxides with the general formula $BaM_xTi_{1-x}O_{3-z}$, wherein M is a cation of one of the following elements: Ti, V, Cr, Mn, Co, Ru, Rh, Ir and Pt. Ti (for $M \neq Ti$) is considered to be present in the $+4$ oxidation state, and the coefficient, z, serves to assure overall charge balance. On the basis of X-ray and magnetic investigations of these compounds, the authors conclude that there exists, within their structure, a covalent bond between the $Ti^{+4}$ cation and the cation designated as M. It is important to note that the latter, as it appears in the hexagonal barium titanate structure, is present in a high oxidation state, e.g., $+4$ in the case of Ir, Ru and Rh, which reflects the strongly oxidizing conditions involved in the preparations of these materials. It is entirely accurate to characterize a compound of the hexagonal barium titanate family as the synthesis product of three oxides: barium oxide, titanium oxide, and the 'donor'-metal-(i.e., V, Mn, etc.) oxide.

In sharp contrast to the preparative conditions employed by Dickson et al., those involved in the preparation of catalysts that have been found to exhibit SMSI properties are strongly reducing in character. The formal oxidation state of the supported Group VIII metal in an SMSI catalyst, as a result of the reducing conditions involved in the treatment afforded the catalyst prior to determination of its adsorptive or catalytic properties, can without doubt be considered to be very low, very likely zero. For this reason, it would be entirely unapparent to one skilled in the art of solid-state chemistry that a covalent interaction found for example to exist within the hexagonal barium titanate lattice, between a $+4$ cation of iridium and a $+4$ cation of titanium, would arise between an essentially zero-valent atom of iridium and a cation of titanium, such interaction, as previously stated, being without precedent in the chemical literature.

The Lewis-acid-base intermetallic compounds may likewise be cited as a class of compounds, described in the chemical literature, that bear a partial resemblance to the SMSI catalyst systems described in this application. Reference may be made to Brewer and Wengert, Metallurgical Transaction, 4, 83–104 (1973) who have attributed the strongly exothermic reactions that occur between metals, such as titanium, which contain unoccupied d-(subshell) orbitals, and metals, such as iridium, that contain internally-paired d-(subshell) electrons, to the transfer of d-electrons from the metal of the latter type to the metal of the former type, resulting in additional covalent bond formation.

Lewis-acid-base intermetallic compounds are, as their name signifies, metallic in nature, being completely and unambiguously zero-valent with respect to each atom contained within their structure. As such, they are clearly differentiated from the model proposed to describe the bonding interactions at the metal-support interface in SMSI catalysts, the latter involving, according to the applicants' speculative model, an essentially zero-valent Group VIII metal atom covalently bonded to a Group IVB or Group VB metal cation. Accordingly, it would be entirely unapparent to one skilled in the art of solid state chemistry and, in particular, familiar with the chemical nature of the Lewis-acid-base intermetallic compounds, that a covalent interaction might exist between a Group IVB (or Group VB) cation and an essentially zero-valent metal atom of Group VIII, such interaction, as previously stated, being without precedent in the chemical literature.

To summarize, in simplified fashion, the comparisons of the nature of the covalently-bonded species in the hexagonal barium titanates, Lewis acid base intermetallic compounds and SMSI catalyst systems, these may be referred to, respectively, as cation-cation, metal-atom-metal-atom, and metal-atom-cation. Alternatively, in terms of a macroscopic description of the reactants involved in the formation of the hexagonal barium titanates, Lewis-acid-base intermetallic compounds and SMSI catalyst systems, these may be designated, respectively, as metal-oxide-metal-oxide, metal-metal, and metal-metal-oxide.

Although the SMSI bonding interaction, as conceived by the applicants, is distinct from that characterizing the Lewis-acid-base intermetallic compounds, applicants have considered the possibility of formation of Lewis-acid-base intermetallic compounds in SMSI catalyst systems. Indeed, it is entirely proper for one to consider the possibility that Lewis-acid-base intermetallic compound formation directly and completely accounts for the various support-effects found to characterize SMSI catalyst. Accordingly, applicants have sought a direct characterization of the surface of an SMSI catalyst by means of photoelectron spectroscopy, usually referred to as electron-spectroscopy-for-chemical-analysis (ESCA), which is capable of revealing the presence of zero-valent titanium, which, should the latter occur in the rhodium/$TiO_2$ catalyst studied in this investigation, might signify the formation of a Lewis-acid-base intermetallic compound.

An ESCA measurement was carried out with a catalyst consisting of 2% Rh/$TiO_2$, the catalyst having been reduced in hydrogen at 550° C. prior to the measurement. It was found that no reduction to zero-valent titanium had, in fact, occurred. As the reduction temperature employed is sufficient to confer SMSI properties, such as the suppression of $H_2$ adsorption onto the Group VIII metal, and as the formation of a Lewis-acid-base intermetallic compound implies the formation of zero-valent titanium, this result indicates that the onset of the SMSI effect does not generally correspond to the formation of a Lewis-acid-base intermetallic compound.

It is nevertheless the applicants' judgment that formation of Lewis-acid-base intermetallic compounds may occur in certain SMSI catalyst systems when sufficiently severe reducing conditions are employed. In this context it should be stressed that intermetallic compounds which may, under certain circumstances, arise is some SMSI catalyst systems described in this application, will differ greatly from those described in the chemical literature. This will be a consequence of the very different preparative techniques employed, leading, in the latter case, to very large particle sizes of at least several hundred Angstroms as compared with well dispersed intermetallic compound phases with particle sizes of the order of 100 Å or less which would characterize those that might arise in SMSI catalyst systems. The large particle size which invariably characterizes the Lewis-acid-base intermetallic compounds prepared in accordance with techniques taught in the chemical literature follows from the highly sintered state of the reactants and the severe temperatures thereby necessitated. In contrast, the formation of intermetallic compounds in SMSI catalyst systems will involve extremely well dispersed reactants which, accordingly, will require relatively low temperatures for reaction to occur. This, in turn, will lead to well dispersed intermetallic compound phases with greatly enhanced catalytic properties as compared with the conventionally prepared phases.

In the present invention, the composition of the catalyst consists of a catalytic metal component selected from the group consisting of Group VIII metals and mixtures thereof of the Periodic Table of the Elements supported on a transition metal oxide selected from the group consisting of Nb, Ta, alkali Group IVB and Group VB and alkaline earth Group IVB and Group VB oxides such as alkaline earth titanates, in particular, barium titanate.

Alternatively, catalytic metal components selected from the group consisting of Fe, Os, Co, Rh, Ir and Ru and mixtures thereof are supported on a transition metal oxide selected from the group consisting of Ti, V, Nb, Ta, alkali Group IVB and Group VB and alkaline earth Group IVB and Group VB oxides, such as alkaline earth titanates, in particular, barium titanate.

Yet again, catalytic metal components selected from the group consisting of Ni, Fe, Os, Co, Rh, Ir, Ru and Pd and mixtures thereof are supported on a transition metal oxide selected from the group consisting of V, Nb, Ta, alkali Group IVB and Group VB and alkaline earth Group IVB and Group VB oxides such as the alkaline earth titanates, in particular, barium titanate.

In yet another alternative, mixtures of the transition metal oxides may be used as supports for the catalytically active metal resulting in catalytic compositions consisting of Fe, Os, Co, Rh, Ir, Ni, Pd, Pt and mixtures thereof on mixtures of two or more of Zr, Ti, V, Nb and Ta oxides, or Hf, Ti, V, Nb and Ta oxides. Alternatively, the catalyst may consist of Group VIII metals and mixtures thereof on supports consisting of mixtures of two or more of V, Nb and Ta oxides. Finally, the catalyst may consist of Group VIII metals and mixtures thereof on supports consisting of mixtures of two or more of Zr, Ti, V, Nb and Ta oxides, or Hf, Ti, V, Nb and Ta oxides. Said catalysts, after a hydrogen reduction at a temperature above a set value, which depends on the support as well as the metal possess the highly dispersed metal particles which interact very strongly with the oxide support. Such interaction is demonstrated by the fact that the chemical properties of the supported metal change dramatically towards gas adsorptions. The above oxide supports can be a single component or a complex oxide of any combination of the mentioned groups. Also it can be a complex oxide with the alkaline earth metal oxides.

In the practice of the instant invention, the enumerated SMSI oxides can be used either in the pure state or alternatively in combination with one or more additional oxides such as alumina, silica, magnesia, zirconia, hafnia, thoria, ceria, etc. Such composites may be prepared by coprecipitation from solutions containing precursor salts of the respective oxides or by deposition of the precursor salt of the SMSI oxide on a carrier.

After the reduction critical temperature is reached, the supported metal is no longer able to adsorb hydrogen and CO at room temperature. However, the supported metal particles are still in a high state of dispersion as is indicated by lack of the metal peaks in the X-ray diffraction spectrum. In addition, the supported metal retains its ability to chemisorb oxygen and high values of O/M are obtained.

As the SMSI effect is considered to be a chemical interaction between the supported metal and the carrier, it is obviously necessary for the metal to be well dispersed in order that sufficient interfacial contact exist between metal and support. Thus, it is clear that in the case of large metal crystallites, the chemical interaction with the support will be incapable of significantly affecting the properties of the surface metal atoms, i.e., those atoms contiguous to the gas phase. In order that the adsorptive and catalytic properties of the supported metal be sufficiently altered by the support to effectively constitute SMSI behavior, the particle size of the supported metal should be 100 Å or less, preferably 50 Å or less.

In addition to the requirement of effective dispersion of the supported metal, a further prerequisite for SMSI behavior has been observed to pertain to the temperature at which the catalyst is activated in hydrogen. It has been found that a difference exists between temperature of hydrogen treatment required to reduce the metal salt to the supported metal, as indicated by the onset of hydrogen adsorption, and the temperature required to bring about the SMSI state of the supported metal, as indicated by the suppression of hydrogen adsorption. Thus, in SMSI-type catalyst systems, i.e. those consisting of Group VIII metals supported on the oxides of titanium, vanadium, niobium, or tantalum or mixtures thereof, and zirconium titanate, the general dependence of hydrogen adsorption, measured at room temperature, upon temperature of activation in hydrogen, consists of an increase of hydrogen adsorption with increasing temperature of activation, reflecting reduction of the metal salt to the metallic state, followed by a decrease in hydrogen adsorption with further increases in the temperature of hydrogen-activation, reflecting passage of the metal from the normal state into the support-interacted state.

It has been found that the temperature of hydrogen-activation needed to confer SMSI properties on the supported Group VIII metal varies with the nature of the particular SMSI support, and, to a lesser extent, with the nature of the particular supported Group VIII metal. Accordingly, this must be determined on an individual basis using the measurement of hydrogen adsorption at room temperature to indicate passage into the SMSI state.

In order to bring about SMSI behavior in catalysts consisting of one or more metals of Group VIII supported upon the oxide of titanium, vanadium, niobium, or tantalum or upon a carrier consisting of a mixture of such oxides, and zirconium titanate, or upon alkaline earth titanates such as barium titanate, it is necessary to subject the composition, prior to use and as the final preparative step to reduction in a reducing atmosphere at a temperature sufficient to cause the composition to exhibit the suppression of hydrogen and carbon monoxide chemisorption. When such hydrogen and carbon monoxide chemisorption suppression is achieved, the composition is in the SMSI state. It is recommended that the following temperatures of activation of the catalyst in the presence of a reducing gas such as hydrogen be employed.

TABLE I

| Metal | Support* | Reduction Temperature at least |
|---|---|---|
| Fe, Co | Ti | 375° C. preferably 425° C. |
| Ir, Ru, Os, Rh | Ti | 200° C. preferably 300° C., most preferably 375° C. |
| Fe, Ni, Co | V | 375° C. preferably 425° C. |
| Pd,Ir,Os,Ru,Rh | V | 200° C. preferably 300° C., most preferably 375° C. |
| Fe, Ni, Co | Nb | 375° C. preferably 425° C. |
| Pd,Pt,Ir,Os,Ru,Rh | Nb | 200° C. preferably 300° C., most preferably 375° C. |
| Fe, Ni, Co | Ta | 375° C. preferably 425° C. |
| Pd,Pt,Ir,Os,Ru,Rh | Ta | 300° C. preferably 400° C., most preferably 500° C. |
| Fe, Co, Ni | Zr-Ti | 375° C. preferably 425° C. |
| Ir,Pd,Os,Rh,Pt | Zr-Ti | 250° C. preferably 350° C. |
| Ir,Pt,Ru,Rh,Os,Pd | Ba-Ti | 550° C. preferably 650° C. |
| Ni, Fe, Co | Ba-Ti | 300° preferably 400° C. |

*In oxide form.

In the forthcoming examples the support metal oxide is designated as that species which is indicated by X-ray diffraction, the precise valency of the surface of the oxide cannot be accurately known so that a designation such as $TiO_2$, $V_2O_3$, is employed purely for the sake of convenience.

EXAMPLE 1

The oxide of titanium was employed as a support. A $TiO_2$-supported Ir catalyst was prepared by impregnation of a high surface area $TiO_2$ (60 m²/g) with an aqueous solution of chloroiridic acid. After impregnation, the catalyst was dried at 110° C.

Room temperature hydrogen chemisorptions were carried out after the catalyst was reduced with hydrogen at various temperatures. X-ray diffraction data were also obtained. Table II compares the gas adsorption behavior of the $TiO_2$-supported catalyst with a conventional $Al_2O_3$-supported Ir catalyst. When the $TiO_2$-supported catalyst was reduced at 120° C., the hydrogen adsorption and X-ray data resembled the conventional Ir catalyst, i.e. the adsorbed hydrogen atom to metal atom ratio was about unity. However, when the reduction temperature increased to 500° C., the $TiO_2$-supported catalyst showed vanishing amount of hydrogen adsorption. The supported iridium retained its original high dispersion as indicated by lack of Ir metal peaks in the X-ray diffraction pattern.

TABLE II

| Catalyst | Treatment | H/M | X-ray |
|---|---|---|---|
| 2% Ir/TiO₂ | Reduced at 120° C. with H₂ | 1.17 | No Ir peaks |

TABLE II-continued

| Catalyst | Treatment | H/M | X-ray |
|---|---|---|---|
|  | Reduced at 500° C. with 2 | 0.02 | No Ir peaks |
| 2% Ir/Al₂O₃ | Reduced at 500° C. with H₂ | 1 | No Ir peaks |

EXAMPLE 2

The complex oxide of $TiO_2$ with the alkaline earth barium was prepared in high surface area (40 m²/g) by reacting titanium tetraisopropylate with $Ba(OH)_2$ in isopropyl alcohol solution to form small particles of $BaTiO_3$. This was impregnated with chloroiridic acid and dried at 110° C.

Hydrogen, CO and oxygen chemisorptions were carried out after the catalyst was reduced with hydrogen at various temperatures. X-ray diffraction data were also obtained. Table III compares the gas adsorption behavior of this catalyst with a conventional $Al_2O_3$-supported Ir catalyst. The $BaTiO_3$-supported catalyst behaved like the conventional catalyst with respect to gas adsorption when the reduction temperature was around 400° C. After the $BaTiO_3$-supported catalyst was treated at 700° C. under hydrogen, it entered into the SMSI state. The $BaTiO_3$-supported catalyst was highly dispersed as indicated by lack of Ir peaks in the X-ray diffraction pattern and high adsorbed oxygen atom to metal atom ratio.

TABLE III

| Catalyst | Treatment | H/M | CO/M | O/M | X-ray |
|---|---|---|---|---|---|
| 2% Ir/BaTiO₃ | Reduced at 400° C. with H₂ | 0.94 | 0.57 | 0.84 | No Ir peaks |
|  | Reduced at 700° C. with H₂ | 0.00 | 0.00 | 0.78 | No Ir peaks |
| 2% Ir/Al₂O₃ | Reduced at 500° C. with H₂ | 1.0 |  |  | No Ir peaks |

EXAMPLE 3

The complex oxide of titanium and zirconium was prepared by hydrolysis of Zr-isopropoxide and Ti-isopropylate in toluene. After it was calcined at 600° C., the BET area was 205 m²/g. This complex oxide may be designated as $ZrTiO_4$ for convenience although the actual degree of formation of the $ZrTiO_4$ structure was not determined. This oxide was impregnated with a rhodium trichloride solution and dried at 110° C.

Hydrogen chemisorption was carried out after the catalyst was reduced at 500° C. X-ray diffraction data were also obtained. Table IV compares the gas adsorption behavior of this catalyst with a conventional $Al_2O_3$-supported Rh catalyst. The $ZrTiO_4$-supported catalyst after the 500° C. reduction entered into the SMSI state. It showed no hydrogen adsorption. The $ZrTiO_4$-supported rhodium was highly dispersed as indicated by lack of Rh peaks in the X-ray diffraction pattern.

TABLE IV

| Catalyst | Treatment | H/M | X-ray |
|---|---|---|---|
| 2% Rh/ZrTiO₄ | Reduced at 500° C. with H₂ | 0.01 | No Rh Peaks |
| 1% Rh/Al₂O₃ | Reduced at 500° C. with H₂ | 1.0 |  |

EXAMPLE 4

The oxides of Ti, V, Nb or Ta, or the mixed oxides of Ba and Ti or the mixed oxides of Zr and Ti were used as supports for Group VIII metals or combinations of them. The supported metal was deposited on the support by the well known method of impregnation. After the particular catalyst composition was reduced at the indicated temperature under hydrogen, as shown in Table V, the adsorptions of $H_2$ or CO were determined. This loss of hydrogen and of CO adsorption properties was not due to metal agglomeration as was indicated by lack of metal X-ray peaks.

(see J. E. Benson and M. Boudart, J. Catalysis, 4, 704 (1965)). Hence the stoichiometry of the adsorbed gases between Eq. (1), (2) and (3) is 0.5:0.5:1:5 or 1:1:3. This titration ratio is normally observed for $Al_2O_3$-supported Pt catalysts. The catalyst composition, 2% $Ir/BaTiO_3$, as shown in Table VI exhibited a H:O:H=1.1:1:3.5 when the catalyst was reduced at 400° C. However, when the catalyst was reduced at 700° C., it entered into the SMSI state and the H:O:H=0:1:00.

TABLE VI

| Catalyst | Treatment | Adsorbed Gas/Metal | Titration Ratio |
| --- | --- | --- | --- |
| 2% $Ir/BaTiO_3$ | Reduced at 400° C. with $H_2$ | H/M = 0.94 | |
| | 350° C. evacuation | O/M = 0.84 | |
| | titration with $H_2$ | H/M = 3.00 | H:O:H = 1.1:1:3.5 |
| 2% $Ir/BaTiO_3$ | Reduced at 700° C. with $H_2$ | H/M = 0.0 | |
| | 350° C. evacuation | O/M = 0.78 | |
| | titration with $H_2$ | H/M = 0.00 | |
| $Pt/Al_2O_3$* | | | H:O:H = 0:1:0 |
| | | | H:O:H = 1:1:3 |

*J. E. Benson and M. Boudart, J. Catalysis, 4, 704 (1965).

TABLE V

| Support | Metal | Wt % | Reduction with $H_2$ T° C. | H/M | CO/M | X-ray |
| --- | --- | --- | --- | --- | --- | --- |
| $TiO_2$ | Ir | 2 | 120° C. | 1.17 | | No Ir peaks |
| | | | 500° C. | 0.02 | 0.2 | No Ir peaks |
| | Ru | 2 | 150° C. | 0.104 | | No Ru peaks |
| | | | 450° C. | 0.009 | | No Ru peaks |
| | Rh | 2 | 175° C. | 0.74 | | |
| | | | 500° C. | 0.02 | | No Rh peaks |
| $ZrTiO_4$ | Ir | 2 | 500° C. | 0.025 | | No Ir peaks |
| | Rh | 2 | 500° C. | 0.01 | | No Rh peaks |
| $BaTiO_3$ | Ir | 2 | 400° C. | 0.94 | 0.57 | No Ir peaks |
| | | | 700° C. | 0.00 | 0.00 | No Ir peaks |
| | Pt | 2 | 400° C. | 0.92 | 0.68 | |
| | | | 700° C. | 0.00 | | No Pt peaks |
| | Pt | 8 | 400° C. | | 0.27 | |
| | | | 700° C. | | 0.00 | No Pt peaks |
| | Pt,Ir | 1,1 | 400° C. | 0.61 | | |
| | | | 700° C. | 0.00 | | No Ir, Pt peaks |
| | Ru | 2 | 400° C. | 0.31 | | |
| | | | 650° C. | 0.055 | | No Ru peaks |
| | Rh | 1 | 400° C. | 1.07 | | |
| | | | 700° C. | 0.00 | | No Rh peaks |
| | Pd | 1 | 400° C. | 0.34 | | |
| | | | 700° C. | 0.0 | | No Pd peaks |
| | Ni | 3 | 450° C. | 0.07 | | No Ni peaks |
| $V_2O_3$ | Ir | 2 | 500° C. | 0.011 | | No Ir peaks |
| $Nb_2O_5$ | Pt | 2 | 150° C. | 0.34 | | |
| | | | 250° C. | 0.086 | | No Pt peaks |
| | Ru | 2 | 450° C. | 0.00 | | No Ru peaks |
| $Ta_2O_5$ | Ir | 2 | 120° C. | 0.77 | | |
| | | | 400° C. | 0.21 | | |
| | Pt | 2 | 200° C. | 0.26 | | |
| | | | 600° C. | 0.00 | | Negligible Pt peaks |

EXAMPLE 5

It is known in the literature that the adsorbed oxygen at an $Al_2O_3$-supported Pt catalyst can be titrated off at room temperature according to the following equations:

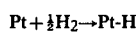  (1)

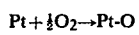  (2)

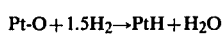  (3)

EXAMPLE 6

Palladium is known to form $PdH_{0.6}$ $\beta$-hydride phase at the appropriate temperature and $H_2$ pressure. Palladium supported on conventional supports such as $Al_2O_3$ and $SiO_2$ exhibits the $PdH_{0.6}$ $\beta$-hydride phase (see P. C. Aben, J. Catalysis 10, 224 (1968). The catalyst composition 4% $Pd/BaTiO_3$ as shown in Table VII, exhibited markedly different behavior than Pd on standard supports to $\beta$-hydride phase formation. In the case of the 4% $Pd/BaTiO_3$ when the reduction temperature was below the critical temperature and the supported Pd particles were not in the SMSI state, the $\beta$-hydride phase did form at high hydrogen pressure. Hydrogen did not absorb into the supported Pd particles when the strong metal support interaction occurred.

TABLE VII

| Catalyst | Treatment | H/Pd at 70° C. 1 mm Hg H$_2$ pressure (adsorption) | H/Pd at 70° C. 300 mm Hg H$_2$ pressure (ads + absorption) | βHydride Phase H$_2$ |
|---|---|---|---|---|
| 4% Pd/BaTiO$_3$ | Reduced 300° C. with H$_2$ | 0.11 | 0.63 | Yes |
|  | Reduced 650° C. with H$_2$ | 0.00 | 0.03 | No |

EXAMPLE 7

Electron micrographs have been obtained for TiO$_2$-supported Ir and BaTiO$_3$-supported Pd in Table VIII. In the case of Ir supported on TiO$_2$, the metal particles were not observable in the electron micrographs, indicating their very small size. There were no observable changes in the particle size of the BaTiO$_3$-supported Pd catalyst after the catalyst was reduced at 700° C. though the H/M decreased from 0.34 to zero. This provides additional evidence that the near-zero H/M values for these catalyst compositions are not due to metal agglomeration but to metal-support interactions.

TABLE VIII

| Catalyst | Treatment | H/M | Electron Micrograph (X 200,000) Particle Size |
|---|---|---|---|
| 2% Ir/TiO$_2$ | Reduced 500° C. | 0.02 | No detectable Ir |
| 1% Pd/BaTiO$_3$ | Reduced 300° C. with H$_2$ | 0.34 | <50 A |
|  | Reduced 700° C. with H$_2$ | 0.00 | <50 A |

ETHANE HYDROGENOLYSIS EXAMPLES

EXAMPLE 8

Ethane hydrogenolysis studies were carried out on 1-2 g samples of catalysts, listed in Table IX, in the temperature range 180°-500° C. Blank runs on pure TiO$_2$ showed that TiO$_2$ itself was inactive for ethane hydrogenolysis. Table IX contains the specific reaction rates for several Group VIII metals on TiO$_2$ or on SiO$_2$. The ethane hydrogenolysis specific reaction rates on SiO$_2$ have been reported by J. H. Sinfelt, Cat. Rev. 3, 175 (1969). These results in Table IX are reported for two representative temperatures of 205° and 295° C. The data in Table IX clearly show that for ethane hydrogenolysis the specific reaction rates of Ru, Os, Rh and Ir supported on TiO$_2$ are substantially suppressed when compared to these metals supported on SiO$_2$. These results also demonstrate that the degree of suppression in the specific reaction rate of ethane hydrogenolysis for metals on TiO$_2$ compared to SiO$_2$ depends on the specific metal. The hydrogenolysis activity of Os and Ru supported on TiO$_2$ is decreased by 3-4 orders of magnitude compared to those metals supported on SiO$_2$. The hydrogenolysis activity of Rh and Ir supported on TiO$_2$ is decreased by 1-2 order of magnitude compared to those metals supported on SiO$_2$. These examples serve to demonstrate that the interaction of metals supported on TiO$_2$ results in significant changes in the metal's catalytic activity compared to that found for a conventional oxide support such as SiO$_2$, and that the resulting catalysts are different from those disclosed in the prior art. Several catalysts investigated on another conventional support material, Al$_2$O$_3$, are also included for comparison in Table IX. All the metals investigated on Al$_2$O$_3$ were found to have significantly greater ethane hydrogenolysis activities than those metals supported on TiO$_2$, again revealing that metals supported on TiO$_2$ result in catalysts which are markedly different from those of the prior art, but which difference was not recognized when TiO$_2$ was disclosed as being equivalent to Al$_2$O$_3$ and SiO$_2$.

TABLE IX

Ethane Hydrogenolysis of Metals of Group VIII on TiO$_2$ and SiO$_2$

| Example No. | Catalyst | Ethane Hydrogenolysis+ Rate at 205° C. | Ethane Hydrogenolysis+ Rate at 295° C. |
|---|---|---|---|
| A | Ru/TiO$_2$ | 6 × 10$^9$ | 8 × 10$^{12}$ |
| B | Ru/SiO$_2$ | 4 × 10$^{13}$ | 6 × 10$^{16}$ |
| C | Os/TiO$_2$ | 2 × 10$^{11}$ | 4 × 10$^{13}$ |
| D | Os/SiO$_2$ | 8 × 10$^{14}$ | 2 × 10$^{17}$ |
| E | Rh/TiO$_2$ | 5 × 10$^{11}$ | 3 × 10$^{14}$ |
| F | Rh/SiO$_2$ | 5 × 10$^{12}$ | 3 × 10$^{15}$ |
| G | Ir/TiO$_2$ | 3 × 10$^{10}$ | 6 × 10$^{13}$ |
| H | Ir/SiO$_2$ | 4 × 10$^{12}$ | 8 × 10$^{14}$ |
| I | Ru/Al$_2$O$_3$ | 3 × 10$^{12}$ | — |
| J | Ir/Al$_2$O$_3$ | 3 × 10$^{11}$ | — |

+Specific reaction rate in molecules/sec./cm$^2$.

EXAMPLE 9

The heptane reforming properties of some catalysts of the instant invention as well as those of some reference catalysts are shown below. (Table X) These experiments were performed in a stainless-steel downflow reactor. The catalysts were charged as 20/40 mesh pressed powders. In situ reductions and reforming runs were carried out at a pressure of 200 psig. The effluent from the reactor was analyzed by gas chromatography. Total conversion and conversion to individual products are expressed as weight % and are based upon entire chromatographic sample, including unreacted feed. "Aromatics" represents sum of toluene and benzene, the former of which greatly exceeded the latter.

Comparison of A and B demonstrates that the catalytic properties of iridium/TiO$_2$ are markedly different from those of iridium/Al$_2$O$_3$. To wit, the production of methane is sharply attenuated for the former. The formation of methane reflects the so-called terminal cracking activity of a catalyst, whereas formation of heavier cracked fragments reflects the so-called center-cracking activity of the catalyst. It is thus seen that the terminal cracking activity of iridium/TiO$_2$ is strongly suppressed whereas the center cracking activity is not. Furthermore, the isomerization activity of iridium/TiO$_2$ (reflected by the yield of iso-$C_7$) is maintained, as is the aromatization activity.

Examples C and D compare Ru/$Al_2O_3$ and Ru/$TiO_2$ and here again, the conventional (i.e. $Al_2O_3$-supported) catalyst is strongly active for terminal cracking. As in the case of iridium, the primary effect of $TiO_2$ in this system is to sharply curtail the terminal cracking activity of ruthenium.

TABLE X

| | | | REFORMING OF n-HEPTANE | | | | | | | |
|---|---|---|---|---|---|---|---|---|---|---|
| Example No. | Catalyst | Red'n T° F. | SV (w/w/hr) $H_2$/HC | T° F. | Conv. | $C_1$ | $C_2 + C_3$ | $C_4 + C_5$ | iso-$C_7$ | Aromatic |
| A | 0.5% Ir/$Al_2O_3$ | 850 | 31/8.0 | 850 | 93 | 77 | 9.7 | 4.1 | 0.5 | 1.0 |
| | | | | 950 | 80 | 52 | 8.4 | 7.7 | 4.0 | 6.2 |
| | + 1½ hrs. | | | 960 | 82 | 32 | 13 | 14 | 6.5 | 13 |
| B | 0.5% Ir/$TiO_2$ | 950 | 31/8.0 | 845 | 42 | 1.6 | 13 | 11 | 10 | 6.3 |
| | | | | 960 | 66 | 3.5 | 23 | 20 | 5.8 | 9.6 |
| | + 2 hr.s | | | 950 | 76 | 3.2/25 | 23 | | 5.9 | 14 |
| C | 1% Ru/$Al_2O_2$ | — | 80/5.0 | 925 | 41 | 35 | — | — | — | Negl |
| D | 0.5% Ru/$TiO_2$ | 925 | 51/5.1 | 930 | — | — | — | — | — | — |
| | | | | 925 | 31 | 0.5 | 4.7 | 5.8 | 16 | 3.0 |
| | + 1 hr | | | 950 | 38 | 1.0 | 7.5 | 8.1 | 16 | 2.2 |

What is claimed is:

1. Improved catalytic composition consisting of a metal selected from the group consisting of iridium, osmium, rhodium and mixtures thereof and an oxide of titanium support prepared by depositing said iridium, osmium, rhodium and mixtures thereof on the oxide of titanium and pretreating the composition prior to use, the improvement comprising, as a final step before use, reducing the composition in a hydrogen atmosphere at a temperature of at least 200° C., thereby producing a composition which exhibits suppressed hydrogen chemisorption.

2. The composition of claim 1 wherein the reducing temperature is at least 300° C.

3. The composition of claim 1 wherein the reducing temperature is at least 375° C.

4. Improved catalytic composition consisting of a metal selected from the group consisting of iron, nickel, cobalt and mixtures thereof and a support selected from the group consisting of the oxides of vanadium, niobium, tantalum and zirconium-titanate prepared by depositing said iron, nickel, cobalt, and mixtures thereof on the support and pretreating the composition prior to use, the improvement comprising, as a final step before use, reducing the composition in a hydrogen atmosphere at a temperature of at least 375° C. thereby producing a composition which exhibits suppressed hydrogen chemisorption.

5. The composition of claim 4 wherein the reducing temperature is at least 425° C.

6. The composition of claim 4 wherein the support is an oxide of vanadium.

7. The composition of claim 6 wherein the oxide of vanadium is $V_2O_3$.

8. The composition of claim 4 wherein the support is an oxide of niobium.

9. The composition of claim 8 wherein the oxide of niobium is $Nb_2O_5$.

10. The composition of claim 4 wherein the support is an oxide of tantalum.

11. The composition of claim 10 wherein the oxide of tantalum is $Ta_2O_5$.

12. The composition of claim 4 wherein the support is zirconium titanate.

13. Improved catalytic composition consisting of a metal selected from the group consisting of palladium, iridium, osmium, ruthenium, rhodium and mixtures thereof and an oxide of vanadium support prepared by depositing the palladium, iridium, osmium, ruthenium, rhodium and mixtures thereof on the oxide of vanadium and pretreating the composition prior to use, the improvement comprising, as a final step before use, reducing the composition in a hydrogen atmosphere at a temperature of at least 200° C. thereby producing a composition which exhibits suppressed hydrogen chemisorption.

14. The composition of claim 13 wherein the reducing temperature is at least 300° C.

15. The composition of claim 13 wherein the reducing temperature is at least 375° C.

16. The composition of claim 13 wherein the oxide of vanadium is $V_2O_3$.

17. Improved catalytic composition consisting of a metal selected from the group consisting of palladium, platinum, iridium, osmium, ruthenium, rhodium and mixtures thereof and an oxide of niobium support prepared by depositing said palladium, platinum, iridium, osmium, ruthenium, rhodium and mixtures thereof on the oxide of niobium and pretreating the composition prior to use, the improvement comprising, as a final step before use, reducing the composition in a hydrogen atmosphere at a temperature of at least 200° C. thereby producing a composition which exhibits suppressed hydrogen chemisorption.

18. The composition of claim 17 wherein the reducing temperature is at least 300° C.

19. The composition of claim 17 wherein the reducing temperature is at least 375° C.

20. The composition of claim 17 wherein the oxide of niobium is $Nb_2O_5$.

21. Improved catalytic composition consisting of a metal selected from the group consisting of palladium, platinum, osmium, iridium, ruthenium, rhodium and mixtures thereof and an oxide of tantalum support prepared by depositing said palladium, platinum, osmium, iridium, ruthenium, rhodium and mixtures thereof on the oxide of tantalum and pretreating the composition prior to use, the improvement comprising as a final step before use reducing the composition in a hydrogen atmosphere at a temperature of at least 300° C. thereby producing a composition which exhibits suppressed hydrogen chemisorption.

22. The composition of claim 21 wherein the reducing temperature is at least 400° C.

23. The composition of claim 21 wherein the reducing temperature is at least 500° C.

24. The composition of claim 21 wherein the oxide of tantalum is $Ta_2O_5$.

25. Improved catalytic composition consisting of a metal selected from the group consisting of iridium, osmium, palladium, rhodium, platinum and mixtures thereof and zirconium titanate support prepared by depositing said iridium, osmium, palladium, rhodium, platinum and mixtures thereof on the zirconium-titanate support and pretreating the composition prior to use, the improvement comprising, as a final step before use, reducing the composition in a hydrogen atmosphere at a temperature of at least 250° C. thereby producing a composition which exhibits suppressed hydrogen chemisorption.

26. The composition of claim 25 wherein the reducing temperature is at least 350° C.

27. Improved catalytic composition consisting of a metal selected from the group consisting of nickel, cobalt, iron and mixtures thereof and an alkaline earth titanate support prepared by depositing said iron, nickel, cobalt and mixtures thereof on the alkaline earth titanate support and pretreating the composition prior to use, the improvement comprising, as a final step before use, reducing the composition in a hydrogen atmosphere at a temperature of at least 300° C. thereby producing a composition which exhibits suppressed hydrogen chemisorption.

28. The composition of claim 27 wherein the reducing temperature is at least 400° C.

29. The composition of claim 27 wherein the alkaline earth titanate is barium titanate.

30. Improved catalytic composition consisting of a metal selected from the group consisting of iridium, platinum, palladium, ruthenium, rhodium, osmium and mixtures thereof and an alkaline earth titanate support prepared by depositing said iridium, platinum, palladium, ruthenium, rhodium, osmium and mixtures thereof on the alkaline earth titanate support and pretreating the composition prior to use, the improvement comprising, as a final step before use, reducing the composition in a hydrogen atmosphere at a temperature of at least 550° C. thereby producing a composition which exhibits suppressed hydrogen chemisorption.

31. The composition of claim 30 wherein the reducing temperature is at least 650° C.

32. The composition of claim 30 wherein the alkaline earth titanate is barium titanate.

* * * * *